2,907,771

ETHYLENE CARBONATE

William C. Mills, Pasadena, Tex., assignor to Olin Mathieson Chemical Corporation, a corporation of Virginia No Drawing. Application December 5, 1957
Serial No. 700,756

3 Claims. (Cl. 260—340.2)

This invention relates to the manufacture of lower alkylene carbonates from alkylene oxides and carbon dioxide. More particularly, it relates to an improved catalyst for the reaction.

It is known that good yields of ethylene carbonate can be obtained by reacting ethylene oxide and carbon dioxide in the presence of calcium or magnesium halides, excepting the fluorides, as described by Cline in U.S. Patent 2,667,497, issued January 26, 1954. In the continuous operation of the process of Cline over protracted periods, however, the solid catalyst undergoes physical and apparently chemical changes, particularly when the catalyst is calcium chloride. It appears to dissolve and/or react, giving rise to a gelatinous precipitate. The latter tends to clog lines, valves and pumps and eventually the reaction mixture sets up completely and stops operation.

It has now been found that, when a solution comprising from 3% to 20% by weight of calcium chloride in from 97% to 80% by weight ethylene carbonate is reacted at from 10° C. to 300° C. until the formation of a gelatinous precipitate substantially ends and the gelatinous precipitate is filtered off, the resulting filtrate possesses catalytic activity for the reaction of alkylene oxides with carbon dioxide to produce alkylene carbonates and does not cause any gelatinous precipitate during the carbonate synthesis. Thus, for instance, if the solution of calcium chloride and ethylene carbonate is permitted to stand for several days at room temperature or for 30 minutes or less at 250° C. and if the gelatinous precipitate which is formed is filtered off, the resulting filtrate effectively catalyzes the carbonate synthesis, particularly when the synthesis is initiated in the filtrate's presence. However, temperatures of about 50° C. to 60° C. are preferred for the reaction leading to the catalytic filtrate.

The resulting catalytic liquid product contains no calcium and contains only a trace, usually less than 0.05 percent by weight, of inorganic halide. However, it also contains an appreciable amount, usually about 1.0 to 4.0 percent by weight or more, of an organically combined halogen, the exact nature of which is unknown. Consequently, the exact manner in which the filtrate exerts its catalytic activity is unknown. It is, on the other hand, particularly surprising in view of the inactivity of ethylene chlorohydrin, ethylene dichloride and other organic halides which could conceivably be present in the liquid product of the reaction of calcium chloride and ethylene carbonate. Nevertheless, while the identity of the catalyst has not been ascertained, its mode of preparation is definite. It has been prepared many times as described above and the resulting liquid is invariably catalytic. The best results are achieved when the catalytic liquid constitutes from 5 to 15 percent by weight of the reaction mixture of alkylene oxide and carbon dioxide. It also appears to be able to catalyze the further reaction of indefinite amounts of alkylene oxides and carbon dioxide to form alkylene carbonates which can easily be recovered in a pure state, free from organic halogen compounds, by distillation.

*Example I*

A stainless steel rocking autoclave was charged with 250 grams ethylene oxide, 322 grams of carbon dioxide and 64 grams catalyst solution. The catalyst solution was prepared by dissolving 5 grams of anhydrous calcium chloride in 95 grams of ethylene carbonate and filtering to remove the white gelatinous precipitate that was formed. The filtrate was then maintained at 100° F. for several days during which time more precipitate was formed and removed by filtration. This solution contained 0.016 percent by weight inorganic chlorides and 1.27 percent by weight organic chlorides. A test for calcium was negative. The reactor was heated to 402° F. (205° C.). After 65 minutes from the start of heating, a maximum pressure of 1550 p.s.i.g. was developed, and after 740 minutes the pressure had dropped to 350 p.s.i.g. After cooling the bomb, the residue was distilled to obtain 300 parts of new ethylene carbonate, a yield of 60.0 percent by weight based on ethylene oxide charged.

*Example II*

A stainless steel rocking autoclave was charged with 250 grams of ethylene oxide, 322 grams of carbon dioxide, and 62 grams of catalyst solution. The catalyst solution was prepared by dissolving 20 grams of anhydrous calcium chloride in 95 grams of ethylene carbonate and filtering to remove the gelatinous precipitate that was formed. The filtrate was then maintained at 100° F. for several days during which time more precipitate was formed and removed by filtration. The solution contained 2.65 percent by weight organic chlorides, 0.0048 percent by weight inorganic chlorides and 0.0013 percent by weight calcium. The reactor was heated to 405° F. After 85 minutes from the start of heating, a maximum pressure of 1700 p.s.i.g. was developed. After 885 minutes the pressure had dropped to 600 p.s.i.g. After cooling the bomb and venting the unreacted gases, the residue was distilled to obtain 414 parts of ethylene carbonate. This represented a yield of 82.8 percent by weight based on the ethylene oxide charged.

What is claimed is:

1. In the production of lower alkylene carbonate by reaction of a mixture of carbon dioxide and lower alkylene oxide under elevated temperature and pressure and recovery of the lower alkylene carbonate from the reaction mixture, the step of initiating the reaction of the mixture of the carbon dioxide and lower alkylene carbonate in the presence of a catalytic solution consisting essentially of the filtrate separately produced by reacting 3% to 20% by weight calcium chloride with 97% to 80% by weight ethylene carbonate at from 10° C. to 300° C. until the formation of gelatinous precipitate substantially ends and filtering off said gelatinous precipitate, said catalytic solution comprising from 5% to 15% by weight of said reaction mixture and being substantially free of calcium and inorganic halide.

2. The method of claim 1 in which the lower alkylene oxide is ethylene oxide.

3. The method of claim 1 in which the catalytic solution contains less than about 0.05 weight percent of inorganic halide.

References Cited in the file of this patent

UNITED STATES PATENTS 2,667,497    Cline _____ Jan. 26, 1954

FOREIGN PATENTS 740,366    Germany _____ Oct. 19, 1943

UNITED STATES PATENT OFFICE

CERTIFICATE OF CORRECTION

Patent No. 2,907,771            October 6, 1959

William C. Mills

It is hereby certified that error appears in the printed specification of the above numbered patent requiring correction and that the said Letters Patent should read as corrected below.

Column 2, lines 51 and 52, for "carbonate" read -- oxide --.

Signed and sealed this 19th day of April 1960.

(SEAL)
Attest:

KARL H. AXLINE
Attesting Officer

ROBERT C. WATSON
Commissioner of Patents